Jan. 31, 1956   W. H. A. BOYD   2,732,765
SQUIB GUN
Filed March 22, 1951

INVENTOR.
William H. A. Boyd
BY
ATTORNEY

United States Patent Office 2,732,765
Patented Jan. 31, 1956

2,732,765

SQUIB GUN

William Hunter A. Boyd, Kensington, Md., assignor to the United States of America as represented by the Secretary of the Navy Application March 22, 1951, Serial No. 217,043

1 Claim. (Cl. 89—1.5)

(Granted under Title 35, U. S. Code (1952), sec. 266)

The present invention relates generally to devices intended to interconnect two or more elements and to effect a quick release between said elements, and more particularly to a squib gun therefor.

To effect a quick release between two or more interconnected elements, it has heretofore been the practice, when employing squib guns, to connect the separable elements by a bolt or other fastening means of sufficient structural strength to withstand the normal forces acting to separate the elements, and to suitably affix to said bolt or fastening means a squib-driven means for shearing or otherwise breaking the connecting bolt, or the like, to free the interconnected elements and permit their separation. Because of the excessive force usually necessary to shear or otherwise break the interconnecting bolt when employing squib guns of this type, their operation is attended with the serious danger of explosion and fragmentation of the squib firing chamber and with the serious disadvantage of not too infrequent failure of the gun to break the fastening bolt.

In accordance with the present invention, however, the foregoing disadvantage and danger are minimized and substantially reduced by providing a squib gun which effects a quick and clean separation between two or more interconnected elements without shearing or breaking any structural member of the connection, thereby enabling the use of smaller squibs and lesser explosion forces than has heretofore been practical. The present squib gun is designed to effect the desired separation of elements by slidably driving the element connecting member from its seat, hence greatly reducing the forces necessary for accomplishing the desired separation.

It is, therefore, one object of the present invention to provide a squib gun for effecting a quick and clean separation between a plurality of interconnected elements, which requires substantially less force therefor than is necessary with conventional squib guns.

Another object of the present invention is to provide a squib gun for effecting a quick and clean separation between a plurality of interconnected elements, which operates by slidably driving the element connecting member from its seat.

Figure 1:
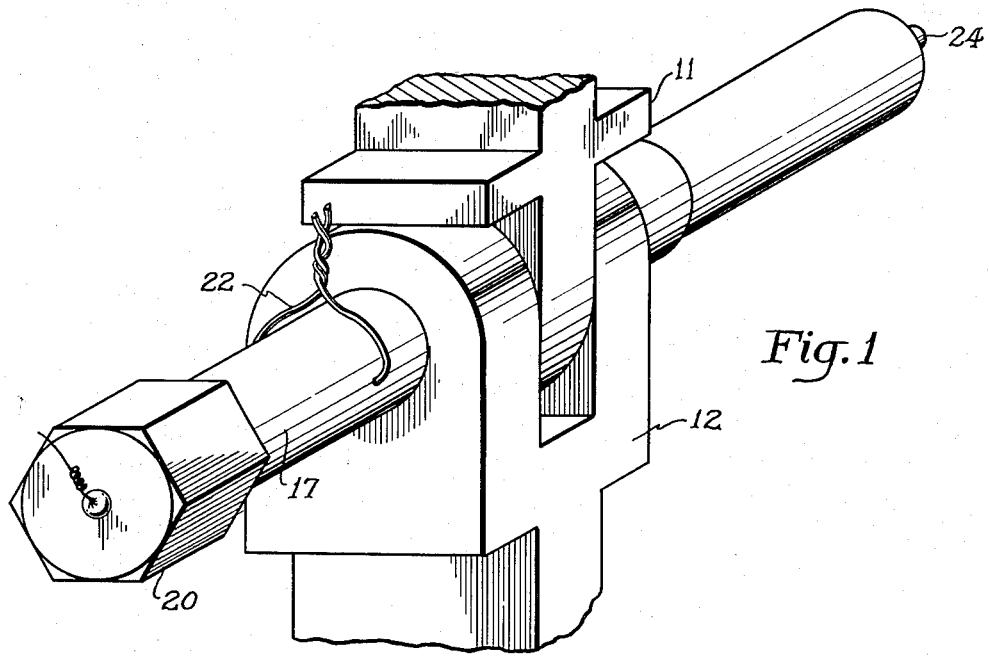
Figure 2:
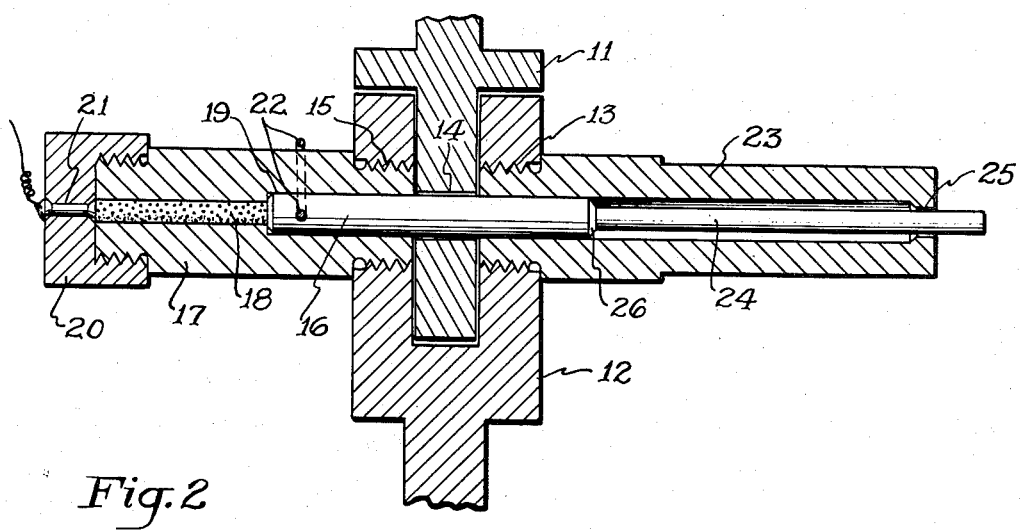

Other objects and advantages of the present invention will become apparent to those skilled in the art from a consideration of the following detailed description of the present invention, had in conjunction with the accompanying drawings in which:

Fig. 1 is an isometric view of an embodiment of the present invention as utilized to separably connect two elements; and Fig. 2 is a vertical sectional view of the device shown in Fig. 1.

The specific embodiment of the present invention shown in the drawings, numerals 11 and 12 indicate two elements separably interconnected by the present squib gun. Element 12 is shown as two-pronged for receiving between its prongs in interleaved fashion the prong of element 11.

Registered holes 13 and 15 provided in the two prongs of element 12 are positioned coaxially with the hole 14 formed in the prong of element 11, so that the element connecting bolt 16 can be readily slid therethrough and inserted in position as shown in the drawings. Firing chamber 17, which functions akin to the breechblock of an ordnance gun, contains squib 18 and is threaded into position in the hole 15 of element 12, thereby receiving a portion of the bolt 16 in the receptacle 19 provided therefor to place the received end of the bolt substantially adjacent the explosive charge or squib 18. A cap 20 containing an electrical contact 21, or the like, may be threaded to the free end of the firing chamber for facilitating ignition of the squib charge. If a lock or retaining wire 22 is employed to hold the bolt 16 in position prior to explosion of the squib 18, the bolt 16 is then rotated to bring a lock wire hole provided therein into registry with similar holes provided in the squib firing chamber 17, and the lock wire is inserted therethrough and tied into place. The assembly is then ready for attachment of a bolt receiving chamber 23. The receiving chamber is slipped over the exposed end of the bolt 16 and threaded into position in the hole 13 provided therefor in element 12, bolt guide tail 24 passing through the registry hole 25 provided therefor in the outer end of the bolt receiving chamber to provide a handle for manually extracting the bolt from or adjusting it in its seat when the squib gun is assembled.

The explosive bolt is now in assembled condition; the positioning of bolt 16 in the squib firing chamber, in the bolt receiving chamber, and through the prongs of elements 11 and 12, and the fastening of the squib firing chamber in the hole 15 and of the bolt receiving chamber in hole 13, securely binds the two elements 11 and 12 together. When it is desired to separate the two elements 11 and 12, the explosive squib 18 is ignited, as by the application thereto of an electrical charge through the contact 21, driving the bolt 16 into the bolt receiving chamber as the bolt guide tail 24 passes through the registry hole 25, thereby leaving the prong of element 11 free to slip out from between the prongs of element 12. To prevent the bolt 16 from biting into the walls of the bolt receiving chamber as it is slidably driven into it, the leading edge 26 of the bolt's main body is beveled, and in addition thereto, the registry of the bolt guide tail 24 with the hole 25 keeps the bolt's main body substantially coaxial with the bolt receiving chamber. In order to obtain efficient operation of this squib gun, it is desirable that gas leakage through the several unions and between the sections thereof be kept to a minimum. Therefore, the diameter of the hole 14 and the diameter of the bolt's main body section are preferably made substantially the same with very close tolerances, and where desired appropriate seals may be utilized to minimize gas escape at the interfaces of the various sections comprising the present squib gun.

As will be apparent to those skilled in the art, the provision of the bolt receiving chamber 23 in the specific embodiment above-described is not necessarily essential to the effective operation of the present squib gun, but is primarily a safety measure for catching the bolt 16 as it is shot from its element interconnecting position. Where appropriate, this bolt receiving chamber may be eliminated and the diameter of hole 13 reduced to that of hole 14, so that when squib 18 is ignited the bolt 16 is shot into space. Likewise the guide tail 14 may be eliminated with the bolt receiving chamber. The specific embodiment of the present invention herein described is presented merely by way of example, and it is not intended to limit the scope of the present invention to the precise details thereof. Other modifications of the present invention will be apparent to those skilled in the art, and those modifications which are within the spirit and scope of the appended claim are within the contemplation of the present patent.

The present invention may be manufactured and used by or for the Government of the United States for governmental purposes without the payment of any royalties thereon or therefor.

What is claimed is:

A squib gun for interconnecting a plurality of elements having interleaving portions provided with registering holes, comprising a squib firing chamber for housing an explosive squib, said firing chamber being unitable with an exterior interleaving portion of said elements and being axially aligned with said registering holes, a connecting bolt adapted to be slidably seated in said firing chamber and said holes, a bolt guide tail forming a reduced diameter extension of one end of said bolt, and a bolt receiving chamber being unitable at one end with another exterior interleaving portion of said elements for housing said guide tail, said receiving chamber having a registry hole therethrough at the other end thereof for receiving the end of said tail, said last-named registry hole being just large enough to pass said guide tail, said guide tail being of sufficient length to visibly protrude from its registry hole for any position of said bolt in the firing chamber, the extent of the protrusion of said guide tail thereby providing an indication of the position of said bolt in the firing chamber, the assembly of the foregoing squib gun members to interleaved portions of a plurality of elements securely interconnecting said elements, and the firing of said squib causing a force to be exerted directly on the end of and along the axis of said belt, thereby slidably driving said bolt out of its seat and into said receiving chamber to enable separation of said elements, said guide tail cooperating with said registry hole to minimize biting of said receiving chamber by said bolt while being driven therein.

References Cited in the file of this patent

UNITED STATES PATENTS

| | | |
|---|---|---|
| 676,838 | Dawson | June 18, 1901 |
| 2,161,082 | Outsohinnikoff | June 6, 1939 |
| 2,421,807 | Richey et al. | June 10, 1947 |
| 2,485,921 | Rockwell | Oct. 25, 1949 |
| 2,489,984 | Shoemaker | Nov. 29, 1949 |
| 2,556,672 | Bergh et al. | June 12, 1951 |

FOREIGN PATENTS

| | | |
|---|---|---|
| 24,944 | Great Britain | of 1906 |
| 281,087 | Germany | Dec. 12, 1914 |
| 770,894 | France | Sept. 22, 1934 |